US010533270B2

(12) United States Patent
Sauti et al.

(10) Patent No.: US 10,533,270 B2
(45) Date of Patent: Jan. 14, 2020

(54) SUCROSE TREATED CARBON NANOTUBE AND GRAPHENE YARNS AND SHEETS

(71) Applicant: U.S.A. as represented by the Administrator of the National Aeronautics and Space Administration, Washington, DC (US)

(72) Inventors: Godfrey Sauti, Hampton, VA (US); Jae-Woo Kim, Newport News, VA (US); Emilie J. Siochi, Newport News, VA (US); Kristopher E. Wise, Poquoson, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 272 days.

(21) Appl. No.: 15/629,799

(22) Filed: Jun. 22, 2017

(65) Prior Publication Data
US 2017/0284000 A1    Oct. 5, 2017

Related U.S. Application Data

(62) Division of application No. 14/206,292, filed on Mar. 12, 2014, now Pat. No. 9,695,531.
(Continued)

(51) Int. Cl.
*B82Y 30/00* (2011.01)
*B82Y 40/00* (2011.01)
(Continued)

(52) U.S. Cl.
CPC ............ *D04H 1/587* (2013.01); *B29B 15/10* (2013.01); *B29C 55/005* (2013.01); *B29C 70/12* (2013.01); *B82Y 30/00* (2013.01); *B82Y 40/00* (2013.01); *C08J 5/24* (2013.01); *C09J 5/00* (2013.01); *D03D 15/00* (2013.01); *D04H 1/64* (2013.01); *D04H 1/645* (2013.01); *D04H 1/74* (2013.01); *D06M 13/148* (2013.01);
(Continued)

(58) Field of Classification Search
CPC ....... B29B 15/10; B29C 55/005; B29C 70/12; B29C 70/14; B29K 2105/162; B29K 2105/167; B82Y 30/00; B82Y 40/00; C01B 32/168; C01B 32/174; C01B 32/194; C01B 2202/08; C08J 5/24; C09J 5/00; D03D 15/00; D03D 25/00; D03D 2700/0133; D03D 2700/014; D03D 2700/0148; D04H 1/4209; D04H 1/4242; D04H 1/587; D04H 1/64; D04H 1/645; D04H 1/74; D06M 13/148; D10B 2101/122
See application file for complete search history.

(56) References Cited

U.S. PATENT DOCUMENTS 6,680,016 B2    1/2004  Wang et al.
7,169,374 B2    1/2007  Siochi et al.
(Continued)

*Primary Examiner* — Michael A Tolin
(74) *Attorney, Agent, or Firm* — Jennifer L. Riley; Robin W. Edwards

(57) ABSTRACT

Consolidated carbon nanotube or graphene yarns and woven sheets are consolidated through the formation of a carbon binder formed from the dehydration of sucrose. The resulting materials, on a macro-scale are lightweight and of a high specific modulus and/or strength. Sucrose is relatively inexpensive and readily available, and the process is therefore cost-effective.

7 Claims, 4 Drawing Sheets

Related U.S. Application Data

(60) Provisional application No. 61/786,825, filed on Mar. 15, 2013.

(51) Int. Cl.

| | | |
|---|---|---|
| *C01B 32/168* | (2017.01) | |
| *C01B 32/194* | (2017.01) | |
| *D03D 15/00* | (2006.01) | |
| *D04H 1/587* | (2012.01) | |
| *D04H 1/74* | (2006.01) | |
| *C08J 5/24* | (2006.01) | |
| *B29C 55/00* | (2006.01) | |
| *B29C 70/12* | (2006.01) | |
| *D04H 1/645* | (2012.01) | |
| *C09J 5/00* | (2006.01) | |
| *D06M 13/148* | (2006.01) | |
| *B29B 15/10* | (2006.01) | |
| *D04H 1/64* | (2012.01) | |
| *B29K 105/16* | (2006.01) | |

(52) U.S. Cl.
CPC .... *B29K 2005/00* (2013.01); *B29K 2105/162* (2013.01); *B29K 2105/167* (2013.01); *D10B 2101/122* (2013.01); *Y10T 428/249921* (2015.04); *Y10T 442/3049* (2015.04)

(56) References Cited

U.S. PATENT DOCUMENTS

| | | |
|---|---|---|
| 7,704,480 B2 | 4/2010 | Jiang et al. |
| 7,923,403 B2 * | 4/2011 | Ma ............... B01J 21/185 |
| | | 502/182 |
| 2006/0116284 A1 | 6/2006 | Pak et al. |
| 2008/0170982 A1 | 7/2008 | Zhang et al. |
| 2009/0155467 A1 | 6/2009 | Wang et al. |
| 2009/0280324 A1 | 11/2009 | Liang et al. |
| 2010/0227155 A1 | 9/2010 | Bao et al. |
| 2011/0168955 A1 | 7/2011 | Abdel-Fattah et al. |

* cited by examiner

US 10,533,270 B2

SUCROSE TREATED CARBON NANOTUBE AND GRAPHENE YARNS AND SHEETS

CROSS-REFERENCE TO RELATED PATENT APPLICATION(S)

This patent application is a divisional application of and claims the benefit of and priority to U.S. patent application Ser. No. 14/206,292, filed on Mar. 12, 2014, now U.S. Pat. No. 9,695,531, which claims the benefit of and priority to U.S. Provisional Patent Application No. 61/786,825, filed on Mar. 15, 2013, the contents of both applications are hereby incorporated by reference in their entireties.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

FIELD OF THE INVENTION

The present invention relates to a method of treating carbon nanotube(s) or graphene yarn(s) and sheet(s) to improve the transport and mechanical properties thereof, and specifically to a process of treating the material with sucrose to lock the carbon nanotubes or graphene sheets in alignment with one another.

BACKGROUND OF THE INVENTION

Various aerospace and terrestrial applications require lightweight materials with very high mechanical properties, particularly specific modulus and strength. Carbon nanotubes and graphene sheets have been found to be such materials. In addition, they have been found to have excellent electrical and thermal transport properties. However translating the excellent properties, particularly mechanical and thermal transport, at the nanoscale level to bulk materials has proven to be a difficult challenge. In order for the nanotubes to be used in applications, they must be spun into yarn(s), sheet(s), and other macroscopic forms introducing relatively weak tube-to-tube and inter-bundle bonds. Also, the nanotubes tend to be entangled, and they therefore do not all contribute in load bearing. Weak coupling at tube and bundle interfaces also leads to mechanical and thermal transport that are much lower than would be expected from the carbon nanotube or graphene properties.

BRIEF SUMMARY OF THE INVENTION

One aspect of the present invention is a method of treating carbon nanotube/graphene yarn, sheet, tape or other macroscopic form. The material is soaked in a sucrose solution, and the sucrose solution is then chemically or thermally dehydrated to form a carbon binder. The soaking and subsequent reduction can be repeated numerous times to obtain the desired sucrose penetration and to form a binder of the desired thickness. Stretching of the carbon nanotube/graphene material during the sucrose infusion and dehydration process leads to locking in of alignment as the binder forms. Such alignment of the carbon nanotubes/graphene sheets leads to large enhancements of the mechanical properties as more of the nanotubes or graphene sheets contribute to load bearing. The strong tube-to-tube and bundle bonds introduced by the carbon binder also serve to enhance the overall mechanical and thermal transport properties of the material as these bonds form conduits for phonons.

These and other features, advantages, and objects of the present invention will be further understood and appreciated by those skilled in the art by reference to the following specification, claims, and appended drawings.

DETAILED DESCRIPTION OF EMBODIMENTS

For purposes of description herein, it is to be understood that the invention may assume various alternative step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
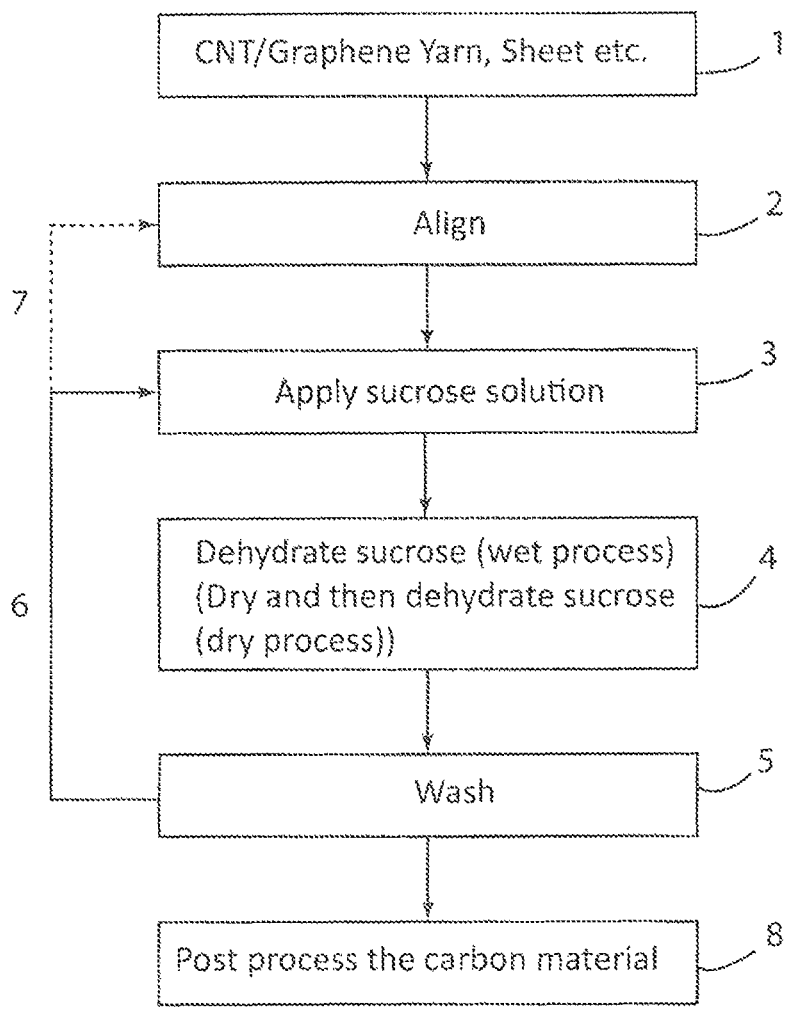
FIG. 1 is a schematic showing a process according to one aspect of the present invention.

The present invention relates to a process for treating carbon nanotube(s) and graphene yarn(s) and sheet(s) with sucrose to improve the mechanical properties of the tube(s), sheet(s), or yarn(s). Any combination of tube(s), sheet(s), yarn(s) can be simultaneously treated. With reference to FIG. 1, carbon material in the form of nanotube or graphene yarn or sheet is initially provided at step 1. The carbon material generally comprises a plurality of microscopic structures such as nanotubes, graphene sheets, or any combinations thereof that are interconnected to form a macroscopic yarn or sheet material. The sheet material can be woven or unwoven. Prior to treatment, the carbon material has a first specific modulus. At step 2, the carbon nanotube(s) or graphene sheet(s) are aligned. Alignment is accomplished by stretching the carbon material by applying a force to the material. A sucrose solution is then applied to the carbon material at step 3. The sucrose solution can be applied by soaking the carbon material, such as carbon yarn or sheet material, in a liquid sucrose solution. The liquid sucrose solution can comprise sucrose and a solvent, wherein the solvent can comprise one or more of water, ethanol, and water/ethanol mixtures. In one embodiment, the liquid sucrose solution is sucrose dissolved in water and ethanol. It will be recognized that various other solvents may also be utilized to dissolve the sucrose.

After the sucrose solution is applied, the carbon material is then dried, wherein water is removed from the solvent used in the sucrose solution, and the sucrose then dehydrated (dry process) or dehydration of the sucrose can be done without the drying step (wet process), as shown in step 4. For the purposes of this application, dehydration is defined as the removal of hydroxyl groups from sucrose to form the amorphous carbon. The dehydration is carried out with acid. In some embodiments, the acid used is sulfuric acid. In some embodiments the acid can be concentrated sulfuric acid. Various chemical dehydration agents including, for example concentrated sulphuric acid ($H_5SO_4$) (as well as heat treatment), can be used to treat and dehydrate the sucrose. After dehydration, the carbon material can be washed to remove any unreacted sucrose or dehydration agent(s), step 5. Applying and dehydrating the sucrose solution while stretching the material (steps 2 to 5) can be repeated numerous times to form a binder of the desired thickness (arrows 6 and 7). In some embodiments, the desired thickness of the binder is a thickness that yields less than about 60% by weight of the resulting nanocomposite. In other embodiments, the binder thickness is less than about 50% by weight, less than about 40% by weight, less than about 30% by weight, less than about 20% by weight, less than about 10% by weight, less than about 5% by weight or less than about 1% by weight of the resulting nanocomposite. The material is preferably stretched in the same direction during the repeated soaking in the sucrose solution and dehydrating of the sucrose.

The process of applying the sucrose solution and dehydrating the sucrose forms a binder that locks the individual carbon nanotubes or graphene sheets and bundles of graphene sheets to one another. In various embodiments the carbon material can be made of nanotube(s), graphene sheet(s), bundles of graphene sheets or any combination of the foregoing. Stretching of the carbon material during the process of applying and dehydrating the sucrose aligns the individual carbon nanotubes or graphene sheets relative to one another, and the sucrose binder locks the microscopic structures in alignment. Such alignment of the carbon nanotubes or graphene sheets in the final material leads to large enhancements of the mechanical properties (e.g. specific modulus) as more of the carbon nanotubes or graphene sheets contribute to load bearing. The interlocking binder improves the interaction of the tubes and bundles, limiting slippage and thus enhancing load carrying capacity. Additionally, the bridges formed by the binder serve to enhance the phonon transport properties, in some embodiments the alignment of the microstructures is 100% in the load direction. In other embodiments the microstructure alignment can be about 90%, about 80%, about 70%, about 60%, about 50% or about 40% in the load direction.

Referring again to FIG. 1, after drying the sucrose solution and dehydrating the remaining sucrose, the carbon material can be washed and subject to further processing. For example, the carbon material can be annealed or used as a platform for further chemical treatment of the yarns or sheets.

Various carbon composite structures can be formed utilizing the treated carbon material such as treated carbon yarns or sheets. For example, the treated carbon material can be dispersed in a matrix material (e.g. polymer resin) to form a carbon fiber structural material. The carbon fiber structural material can be a rigid composite structure. Numerous aerospace applications require lightweight structural materials with high specific modulus and strength. Examples of applications include, but are not limited to, structural materials for aerospace vehicles, materials for lightweight, mechanically robust consumer devices, and materials for space habitats.

Figure 2:
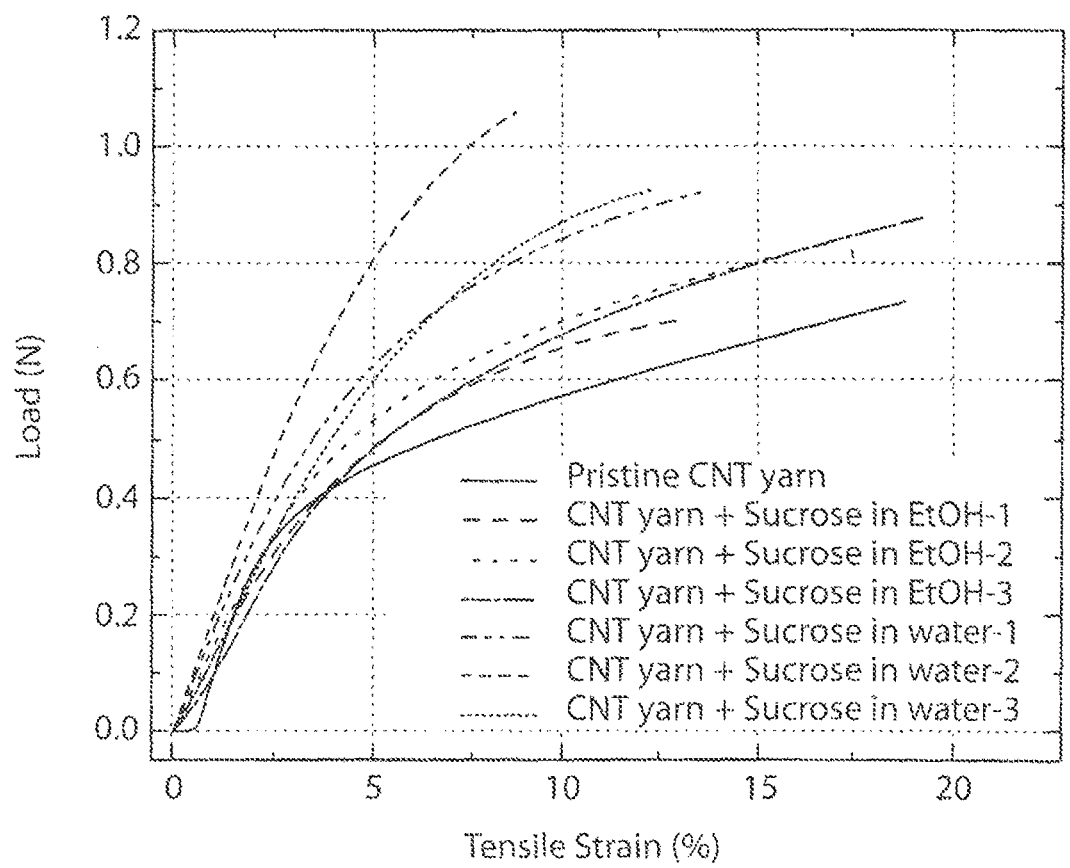
FIG. 2 is a graph showing mechanical properties of carbon nanotube yarns that has been treated with either a sucrose/ethanol mixture or a sucrose/water mixture.

Testing of the carbon yarn treated according to the present invention has shown a dramatic increase in mechanical properties. FIG. 2 is a graph showing the mechanical properties of carbon nanotube ("CNT") yarns treated with a sucrose and ethanol mixture and of carbon nanotube ("CNT") yarns treated with a sucrose and water mixture. The mixtures of FIG. 2 were a saturated solution of sucrose. As shown in FIG. 2, the mechanical properties (modulus) of the yarns increase significantly after treatment with the sucrose and ethanol or the sucrose and water mixtures.

Figure 3:
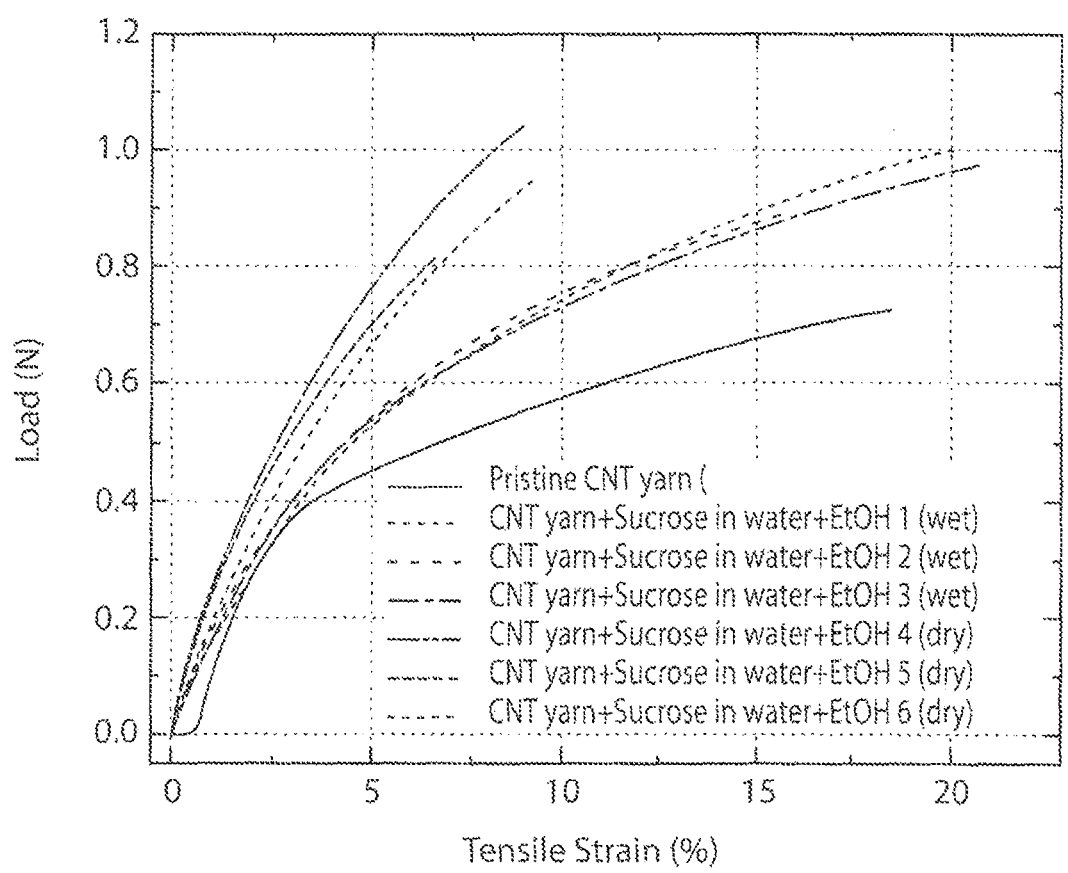
FIG. 3 is a graph showing mechanical properties of carbon nanotube yarns treated with a sucrose/ethanol/water mixture.

FIG. 3 is a graph showing the mechanical properties of carbon nanotube ("CNT") yarns that have been treated with sucrose dissolved in an ethanol/water mixture. Again, the mechanical properties (modulus) of the yarns increase significantly after treatment with the sucrose with ethanol/water mixtures. From FIG. 4(3), cycle 1 added ~0.2 g/m of amorphous carbon to the yarn. Cycle 3 added a total of 0.5 g/m of amorphous carbon to the untreated yarn. These numbers were calculated from the tex values shown on the graph caption where tex is defined as g/m length of the CNT yarn.

FIG. 3 also shows the results of both a wet process and a dry process utilizing a concentrated (98%) $H_2SO_4$ solution. Drying requires heating to 110° C. to remove the water. Dehydration is carried out by dipping the dry treated material in concentrated sulfuric acid until the reaction is complete—no more fumes are formed so all the sucrose has reacted.

Figure 4:
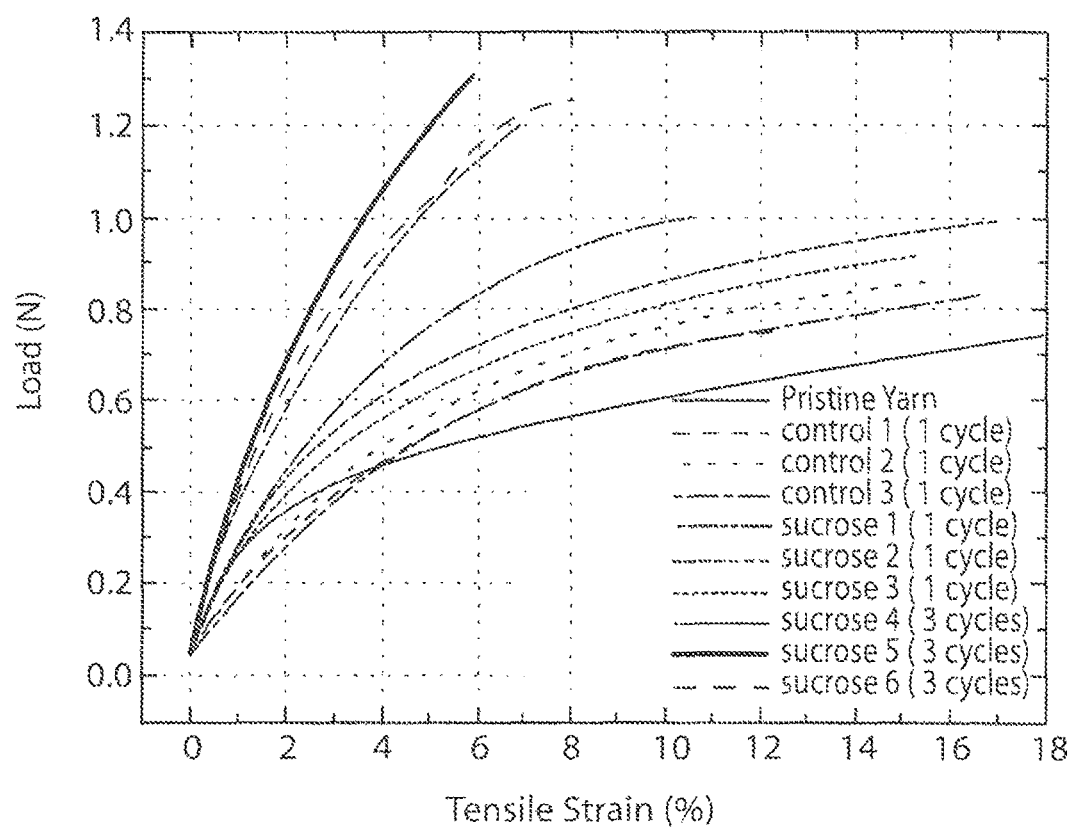
FIG. 4 is a graph showing mechanical properties of carbon nanotube yarns that have been treated with a sucrose mixture over several treatment cycles.

FIG. 4 is a graph showing the mechanical properties of CNT yarns treated over several cycles. Control yarns have no treatment. Sucrose yarns are always treated with a solution of sucrose so it would be sucrose mixture. Mixture concentrations are always saturated sugar solutions. Sucrose 1 and sucrose 4 are treated with the same sucrose mixture and only differ from each other by the number of sucrose mixture treatment cycles.

The carbon obtained from the dehydration of the sucrose serves to bind the CNTs/CNT bundles in the sheet or yarn to lock in alignment and enable better load transfer between the tubes and/or bundles leading to materials with greatly enhanced mechanical properties as shown in FIGS. 2-4. FIGS. 2-4 show that a greater than 30% increase in tensile properties was realized for non-optimum starting materials.

It is to be understood that variations and modifications can be made on the aforementioned structure without departing from the concepts of the present invention, and further it is to be understood that such concepts are intended to be covered by the following claims unless these claims by their language expressly state otherwise.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "some embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A carbon material, comprising:
   a plurality of microscopic carbon structures that are interconnected to form a sheet or yarn, wherein 40 to 100 percent of the microscopic carbon structures are at least partially aligned with one another;
   a dehydrated sucrose binder formed by subjecting sucrose to a dehydration reaction, the dehydrated sucrose binder dispersed on at least some of the microscopic carbon structures; wherein the dehydrated sucrose binder binds adjacent microscopic carbon structures together and maintains alignment of the microscopic carbon structures.

2. The carbon material of claim 1, wherein the microscopic carbon structures comprise carbon nanotubes.

3. The carbon material of claim 2, wherein the carbon nanotubes form a macroscopic sheet.

4. The carbon material of claim 2, wherein the carbon nanotubes form a macroscopic yarn.

5. The carbon material of claim 1, wherein the sheet is a woven material.

6. A rigid composite structure, comprising:
   the carbon material of claim 1 and a rigid matrix material, wherein the carbon material is provided in the rigid matrix material to form the rigid composite structure.

7. The rigid composite structure of claim 6, wherein the rigid matrix material comprises a polymer.

* * * * *